(12) United States Patent
Sims et al.

(10) Patent No.: US 7,040,570 B2
(45) Date of Patent: May 9, 2006

(54) WEATHER-AGILE RECONFIGURABLE AUTOMATIC TARGET RECOGNITION SYSTEM

(75) Inventors: S. Richard F. Sims, Huntsville, AL (US); William C. Pittman, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 193 days.

(21) Appl. No.: 10/675,596

(22) Filed: Sep. 29, 2003

(65) Prior Publication Data

US 2005/0087649 A1   Apr. 28, 2005

(51) Int. Cl.
   *F42B 15/01*   (2006.01)
   *F41G 7/00*   (2006.01)
(52) U.S. Cl. .............. 244/3.16; 244/3.1; 244/3.15; 244/3.17; 342/25 R; 342/52; 342/53; 342/54; 342/61; 342/62; 342/89; 342/90; 342/175; 342/189; 342/195; 89/1.11; 382/100; 382/103
(58) Field of Classification Search .... 342/25 R–25 F, 342/26 R–26 D, 27, 28, 52–59, 89, 90, 175, 342/189–197, 61–66, 165–174; 244/3.1–3.3; 89/1.11; 356/4.01–5.15; 382/100, 103
See application file for complete search history.

(56) References Cited

U.S. PATENT DOCUMENTS 5,225,839 A *  7/1993  Okurowski et al. ......... 342/174
5,245,347 A *  9/1993  Bonta et al. ................ 342/196
5,473,331 A * 12/1995  Kennedy et al. .............. 342/62
5,561,431 A * 10/1996  Peele et al. ................... 342/90
5,867,118 A *  2/1999  McCoy et al. ................ 342/90
6,079,665 A *  6/2000  Nella et al. ................ 244/3.17
6,111,241 A    8/2000  English et al.
6,157,875 A * 12/2000  Hedman et al. ........... 244/3.15
6,347,762 B1 * 2/2002  Sims et al. ................ 244/3.17
6,362,775 B1 * 3/2002  Goebel et al. ................ 342/64
6,535,647 B1   3/2003  Abousleman

OTHER PUBLICATIONS

"Image Metrics for Clutter Characterization," by Kameswara Rao Namuduri, Karim Bouyoucef and Lance M. Kaplan; *IEEE Proceedings of the International Conference in Image Processing*, vol. 2, Sep. 10-13, 2000, pp. 467-470.

(Continued)

*Primary Examiner*—Bernarr E. Gregory
(74) *Attorney, Agent, or Firm*—Hay Kyung Chang

(57) ABSTRACT

Applicants' ATR system is weather-agile because it is comprised of a primary target sensing means that is capable of surveilling the target scene in foul or fair weather, and a secondary target sensing means that is also capable of sensing targets in various weather. The primary and secondary sensing means communicate through a control center so that ultimately, among several weapons available, the most strategically located and equipped weapon is activated for the destruction of a selected target, given the weather. The control center accomplishes the communication by receiving the sensed target signature from the primary sensing means, processing the signature using database already resident in the center and transmitting the processed target signature to the weapon possessing the greatest potential for successfully destroying the target.

10 Claims, 5 Drawing Sheets

OTHER PUBLICATIONS

"SAR amd HSI Data Fusion for Counter CC&D," by Su May Hsu, John P. Kerekes, Hsiao-hua Burke and Steve Crooks; *The Record of the IEEE 1999 Radar Conference*, Apr. 20-22, 1999, pp. 218-220.

"The Fusion of Different Resolution SAR Images," by Mario Costantini, Alfonso Farina and Francesco Zirilli; *Proceedings of the IEEE*, vol. 85, No. 1, Jan. 1997, pp. 139-146.

* cited by examiner

WEATHER-AGILE RECONFIGURABLE AUTOMATIC TARGET RECOGNITION SYSTEM

DEDICATORY CLAUSE

The invention described herein may be manufactured, used and licensed by or for the Government for governmental purposes without the payment to us of any royalties thereon.

BACKGROUND OF THE INVENTION

On many battlefields, well-known target signatures are distorted by real-world effects, such as various and varying environmental conditions. Further, new, heretofore-unknown targets emerge that need to be defined. As a consequence, updates of a target acquisition or automatic target recognition (ATR) knowledge base are and continue to be a necessity for autonomous precision strike weapons. Such autonomous precision strike weapons utilize all possible target sensing means except direct laser designation of the targets.

ATR systems that use some type of pattern recognition need some form of knowledge or training database resident in the systems for proper operation. Since the performance of any ATR system is limited by these training data and often even known targets are obscured by camouflage and other means, most real-world applications require some real-time updates (i.e. retraining) of the target knowledge database. This requirement also holds true for any new mobile or fixed targets. This "real-time" retraining is referred to as rapid retraining or rapid target update.

In an ATR system, the typically required information for the pattern recognizer consists of target and background clutter signatures in the electromagnetic band of interest. The robustness of ATR performance is usually quantified by correct classification of targets in some form, such as recognition or identification and false alarms defined as either clutter or misclassifications. The best ATR for any specific system application can be selected from known algorithms that are amenable to rapid retraining and also appropriate for the timeline for the specific application at hand. To maintain the ATR robustness through rapid target updating, however, the ATR must have the flexibility to be reconfigured in response to the target scene information provided by the surveillance means. Part of this updating process includes establishing metrics of the clutter in the target scene so that the criteria on ATR performance can be established for the specific target environment.

In general, multiple simultaneous weapon engagements are desired to eliminate multiple targets in a very short period of time. The rapid retraining of multiple weapons is restricted by the limitations of available and compatible sensors.

SUMMARY OF THE INVENTION

Applicants' ATR system is weather-agile because it is comprised of a first target sensing means, either singular or plural, that is (are) capable of surveilling the target scene in foul or fair weather, and a second target sensing means, comprised of a group of sensors. At least one sensor from the group comprising the second target sensing means is mounted on one of several available weapons. These sensors can also sense targets in either foul or fair weather. Applicants' ATR system makes it possible to use dissimilar sensors in surveillance and in the weapons, while not excluding the use of similar active or passive sensors when conditions allow.

The first and second sensing means communicate through a control center so that ultimately, among the several weapons available, the most strategically located (based on its trajectory relative to the selected target) and equipped (relative to the weather) weapon is activated for the destruction of a selected target. The control center accomplishes the communication by receiving the sensed target signature from the first sensing means, processing the signature using database already resident in the center and transmitting the processed target signature to the weapon possessing the greatest potential for successfully destroying the target.

DESCRIPTION OF THE PREFERRED EMBODIMENT

Figure 1:
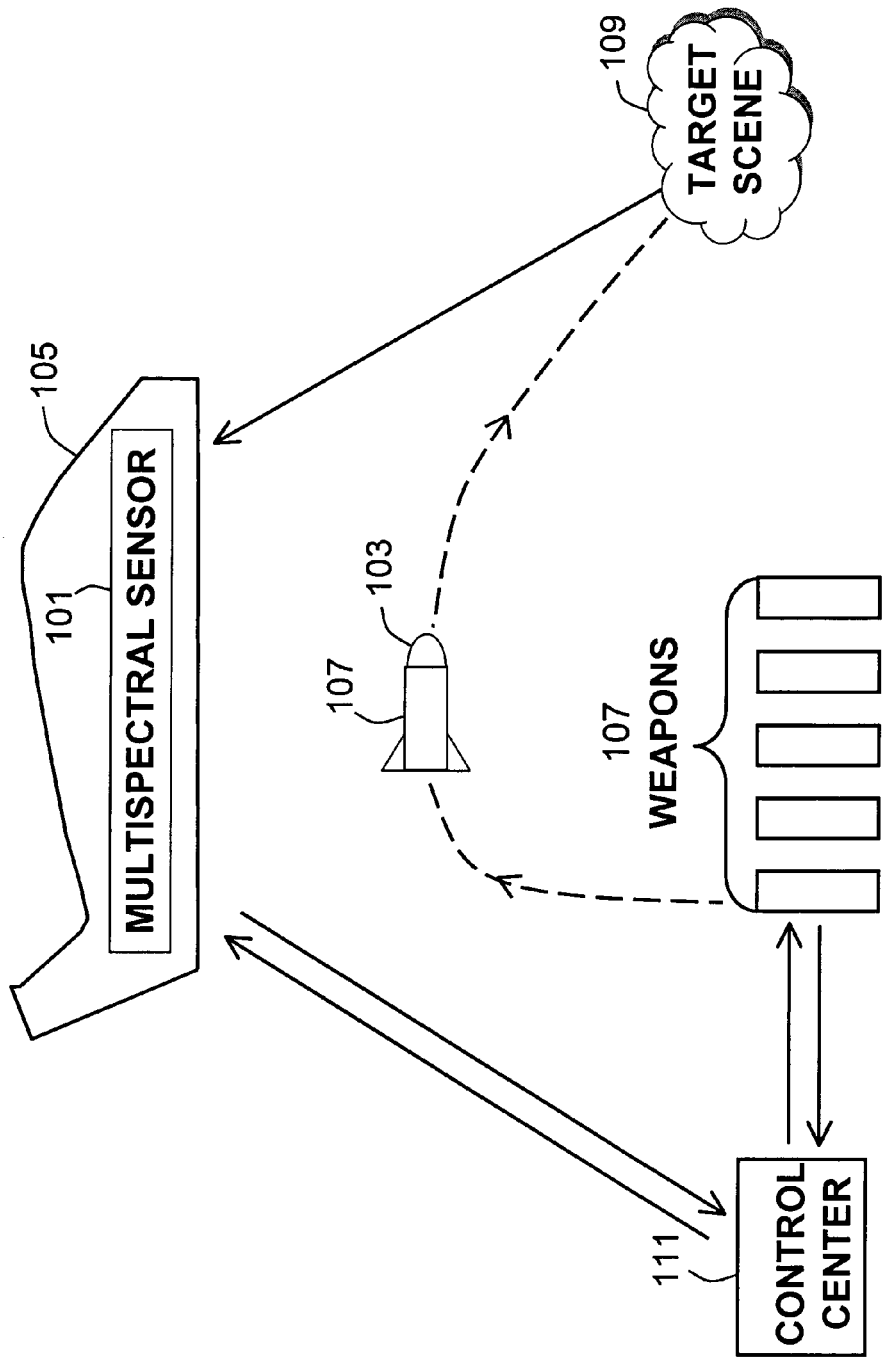
FIG. 1 illustrates the Weather-Agile Reconfigurable ATR System having multi-spectral target sensing means on both the surveillance platform and the weapons.

Refer now to the drawing wherein like numbers represent like parts in each of the several figures, solid lines with arrowheads represent signal paths and dotted lines with arrowheads represent the weapon trajectory. With reference to the drawing, different combinations of various types of primary and secondary sensing means are presented for changeable climatic conditions.

FIG. 1 is a diagram of the Weather-Agile Reconfigurable ATR System having multi-spectral target sensing means on both the surveillance platform and on the weapons. The primary sensing means is multi-spectral sensor 101 mounted onto airborne surveillance platform 105 from which it surveils target scene 109 through any kind of weather that may exist between the platform and the target scene. From this surveillance activity, the multi-spectral sensor produces target signature information that is descriptive of the type of target detected. This target signature information is downlinked to control center 111, also through any kind of weather condition.

The control center has therein pre-existing database which pertains to, among others, target spectra, terrain and material classification, topography, atmospheric correction for converting radiance to reflectance, the capabilities and limitations of the sensing means on the available weaponry and the location of the weaponry. The control center transmits this database, to the extent practical, to surveillance platform 105 to optimize the transfer between the primary sensing means and the control center of the most useful information for rapid retraining.

Upon receipt of the target signature information, the control center processes (reformats) the information to discover the type and location of the detected target and selects, among available weapons 107, the particular weapon that is most likely to succeed in destroying the detected target. The likelihood of success is determined based on the location of the weapon, its predicted trajectory relative to the location of the target and the weapon's destructive capabilities. The selected weapon confirms to the control center the receipt of the update. Thereafter, the weapon is launched toward the target. In the embodiment shown in FIG. 1, the suitability of secondary sensing means 103 on the weapon for detection of the target through the weather encompassing the trajectory is deemed irrelevant since it is a multi-spectral sensor capable of functioning in all weather conditions.

Figure 2:
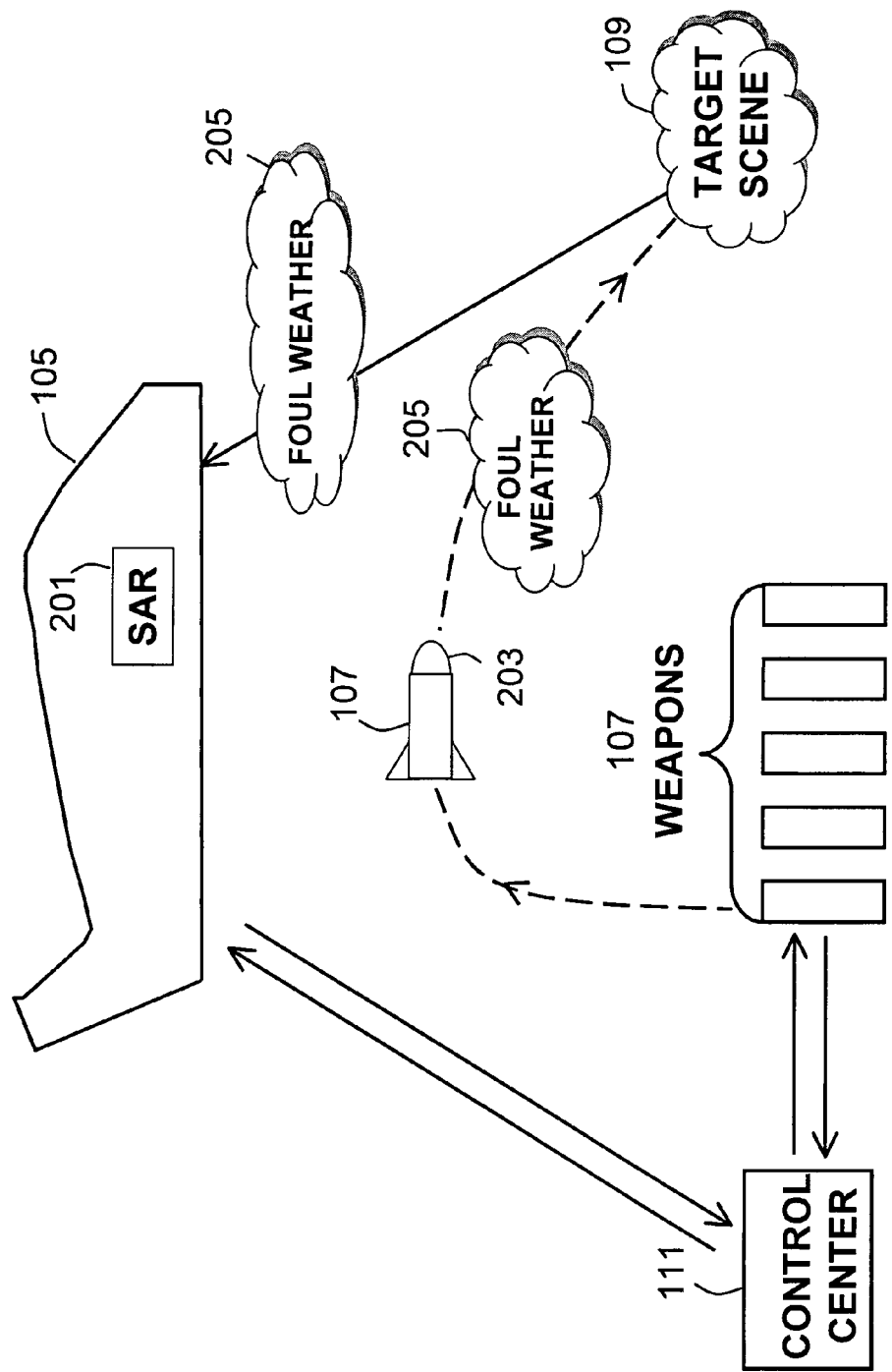
FIG. 2 shows the Reconfigurable ATR system wherein both the surveillance and weapon sensors are synthetic aperture radars (SAR's).

FIG. 2 shows the Reconfigurable ATR system wherein both the surveillance and weapon sensors are synthetic aperture radars (SAR) 201 and 203, respectively. Such active sensors of the same type being used together offers the highest potential for image matching of spatial features. If SAR sensors having different resolutions (example: higher resolution on the surveillance producing a finer or higher-resolution image, and lower resolution on the weapons producing a coarser or lower-resolution image) are used, the two different resolution images of the same scene can be fused using the method taught by Marco Costantini et al. in their article "The Fusion of Different Resolution SAR Images," in the *PROCEEDINGS OF THE IEEE*, vol. 85, No. 1, pages 139–146. The objective of the Costantini method is to fuse two different spatial resolution SAR images to provide a fused image with improved ability to detect point scatterers in a uniform background. Since SAR images are acquired in range-doppler coordinate system, both images must be acquired in this coordinate system. Both the high-resolution and the low-resolution instruments collecting the images are digital instruments, and the fusion process is pixel level fusion in contrast with other fusion methods; for example, feature level fusion. In the Costantini method, the fusion of the two images is carried out by obtaining the image which has the least mean square deviation from the finer-resolution image. The higher-resolution image may be viewed as the reference image on which the fusion process takes place, but a pre-requisite is that the two images be co-registered. The expected intensity of the lower resolution image is then constrained to be the local average of the expected intensity of the higher-resolution image. The relative variance of the two images is introduced to adaptively adjust the weight of intensity. The result sought is a reconstruction of the expected image intensity at the finer-resolution which is less noisy than that given by the finer-resolution image intensity above. The minimization problem with MN independent variables can be decomposed in MN/mn independent variables. So, in the Costantini method, a Cartesian coordinate system is used to describe an image surface in (x,y). From this surface, a (x,y) and ø (x,y) describe the amplitude and phases, respectively, of the signals received by the two digital instruments, one with a complex impulse response h (x,y)—the higher resolution instrument; and the second with a complex impulse response h'(x,y)—the lower resolution instrument. The "width" of the impulse response defines the spatial resolution of the two instruments. The imaging pixels of the two instruments are arranged in parallel with the coordinates of the imaging surface. The pixels of the higher resolution instrument have dimensions, $\Delta x$ and $\Delta y$, with reference at $x_o$, $y_o$. The following definition of symbols applies hereinafter:

x, y: the coordinates of the imaged surface; positive real numbers.

$\Delta x$, $\Delta y$: pixel dimensions of the higher resolution image; positive real numbers.

$x_o$, $y_o$: the lower left corner of the imaged surface (the zero point of the coordinate system).

$x_i = x_o + i\Delta x$ and $y_j = y_o + j\Delta y$ refer to the i, j pixels of higher resolution image.

M, N refers to the higher resolution instrument pixel elements.

m, n refers to the lower resolution instrument pixels.

(i,j) refers to the higher resolution image.

(i', j') are the labels for the lower resolution instrument.

$R_x$, $R_y$ are positive numbers defining the resolution of the higher resolution instrument along the two coordinates x, y.

Using the above, the pixels in the higher resolution instrument are identified as follows:

$$(ij), i=0, 1, \text{---} M-1, j=0, 1, \text{--} N-1 \qquad (1)$$

For the lower resolution instrument, the pixels are identified as:

$$(i'j'), i' = 0, 1\text{--}\frac{M}{m}-1, i' = 0, 1\text{--}\frac{N}{n}-1 \qquad (2)$$

Where $$\frac{M}{m}$$

and $$\frac{N}{n}$$

are the ratios between the coarser and finer resolution cells.

With the identification of the geometric relationship between the two-dimensional pixel array of the higher resolution instrument and imaging surface, the complex value of the image is:

$$C_{ij} = \int_{\infty}^{\infty}\int_{\infty}^{\infty} h(x-x_i, y-y_i)a(x,y)\exp(i\phi(x,y))dxdy \text{ (higher resolution)}$$

The image intensity is:

$I_{ij}=|C_{ij}|$, (higher resolution)

(3) The expected value of image intensity is:

$$\langle I_{ij}\rangle = \int_{\infty}^{\infty}\int_{\infty}^{\infty} |h(x-x_i, y-y_i)|^2 \langle [a(x,y)]^2\rangle dxdy \text{ (higher resolution)}$$

From equation (2), the coordinates of the pixels of the lower resolution instrument are identified; which leads to:

$$x'_i = x_0 + \frac{(m-1)\Delta x}{2} + i'm\Delta x \quad (4)$$

$$y'_j = y_0 + \frac{(n-1)\Delta x}{2} + j'n\Delta y \quad (5)$$

These two equations assume that the two images are co-registered. From this, the expected intensity of the lower resolution instrument is obtained:

$$\langle I'_{i'j'} \rangle = \int_{\infty}^{\infty} \int_{\infty}^{\infty} |h'(x - x'_i, y - y'_j)|^2 \langle [a(x,y)]^2 \rangle dx dy \quad (6)$$

The two images of the same scene are statistically independent, and the relative variance of the two images are:

$$v = \frac{\langle (I_{ij} - \langle I_{ij} \rangle)^2 \rangle}{\langle \langle I_{ij} \rangle \rangle^2} \text{ Higher Resolution Image (independent of } ij) \quad (7)$$

$$v = \frac{\langle (I'_{i'j'} - \langle I'_{i'j'} \rangle)^2 \rangle}{\langle \langle I'_{i'j'} \rangle \rangle^2} \text{ Lower Resolution Image (independent of } i'j') \quad (8)$$

The square of the absolute value of the impulse responses of the two instruments are:

$$|h(x,y)|^2 = \frac{l}{RxRy} \text{ for } |x| \leq Rx, \quad (9)$$

$$|y| \leq Ry \text{ Higher Resolution Instrument and}$$

$$|h'(x,y)|^2 = \frac{l}{mn} |h(x/m, y/m)|^2 \text{ Lower Resolution Instrument} \quad (10)$$

By combining (3), (6), (9) and (10), the result is $$\langle I'_{i'j'} \rangle = \frac{l}{mn} \sum_{i=i'm}^{(i'+\lambda)m-\lambda} \sum_{j=j'n}^{(j'+\lambda)n-\lambda} \langle I_{ij} \rangle \quad (11)$$

That is, the expected intensity of the lower resolution image is the local average of the higher resolution image. The fusion of the two image intensities is obtained as the solution to the following minimization problem:

$$\left\{ \min_{X_{ij}} \right\} \sum_{i=0}^{M-1} \sum_{j=0}^{N-1} (X_{ij} - I_{ij})^2 \quad (12)$$

Subject to the constraints:

$$\frac{\sum_{k=i'm}^{(i'+\lambda)m-\lambda} \sum_{\lambda=j'n}^{(j'+\lambda)n-\lambda} X_{ki}}{mn} = \frac{\frac{l}{v'} I_{i'j'} + \frac{l}{v} \sum_{k=i'm}^{(i'+\lambda)m-\lambda} \sum_{\lambda=j'n}^{(j'+\lambda)n-\lambda}}{\frac{l}{v'} + \frac{mn}{v}} \quad (13)$$

And:

$$X_{ij} \geq 0 \quad (14)$$

Where, in (13) i=0, 1--M/m−1, j=0, 1 ---- N/n−1 - and in (14) i=0, 1, --M−1 and j=0, 1, ---N−1

Equation (13) enforces the condition that the expected image intensity of the coarser resolution instrument must be the appropriate weighted average (with weights $$\frac{l}{v'}$$

and $$\frac{mn}{v}$$

of the coarser resolution estimated from the two images. Equation (14) indicates that the intensity is always positive. The minimization problem with MN independent variables can be decomposed in MN/mn independent variables. The sub-problems are labeled: i'=0, 1, --- M/m−1, j'=0, 1, ---N/n−1. The (i', j')th sub-problem is the following:

$$\frac{mm}{X_{ki}} \sum_{k=im}^{(i+\lambda)m-\lambda} \sum_{\lambda=j'n}^{(j'+\lambda)n-\lambda} (X_{ki} - I_{ki})^2 \quad (15)$$

Subject to the constraints of (13) and $$X_{k1} \geq 0 \quad (16)$$

Where, in (16): k=i'm, i'm+1, ---(i'+1) m−1
1=j'n, j'n+1 --- ('j'+1)−1

By thusly performing a fusion of the images as taught by Costantini et al, a better match between the sensors can be achieved.

The SAR-to-SAR configuration is particularly useful when both sensors must operate in foul weather because when the weather is poor, electro-optical sensors or hyperspectral sensors provide little or no capability. In FIG. 2, SAR imagery is collected over target scene 109 in foul weather indicated by clouds 205. In addition to clouds, the foul weather can be fog or rain. The SAR image collected must include both potential targets, confusers and clutter so that eventually a high level of precision strike can be performed with virtually zero false alarms and avoid unintended targets. The collected SAR imagery is compressed and down-linked to the control center with the position coordinates of the potential targets or "regions of interest"

and the position of the surveillance platform relative to the available weapons. Upon receipt, the control center decompresses the imagery, performs coordinate transformation for a specific weapon trajectory and performs the discrimination and classification processes using synthetic discrimination function filter. From this is derived the target spatial information which is formatted to allow rapid retraining of weapons with synthetic aperture radar 203. It is noted that in the future, the control center itself may potentially be eliminated or bypassed and its functionality placed either at first or second sensing means or partitioned between the two. This direct communication between the sensing means would help minimize the latency and result in improved target elimination timeline.

Figure 3:
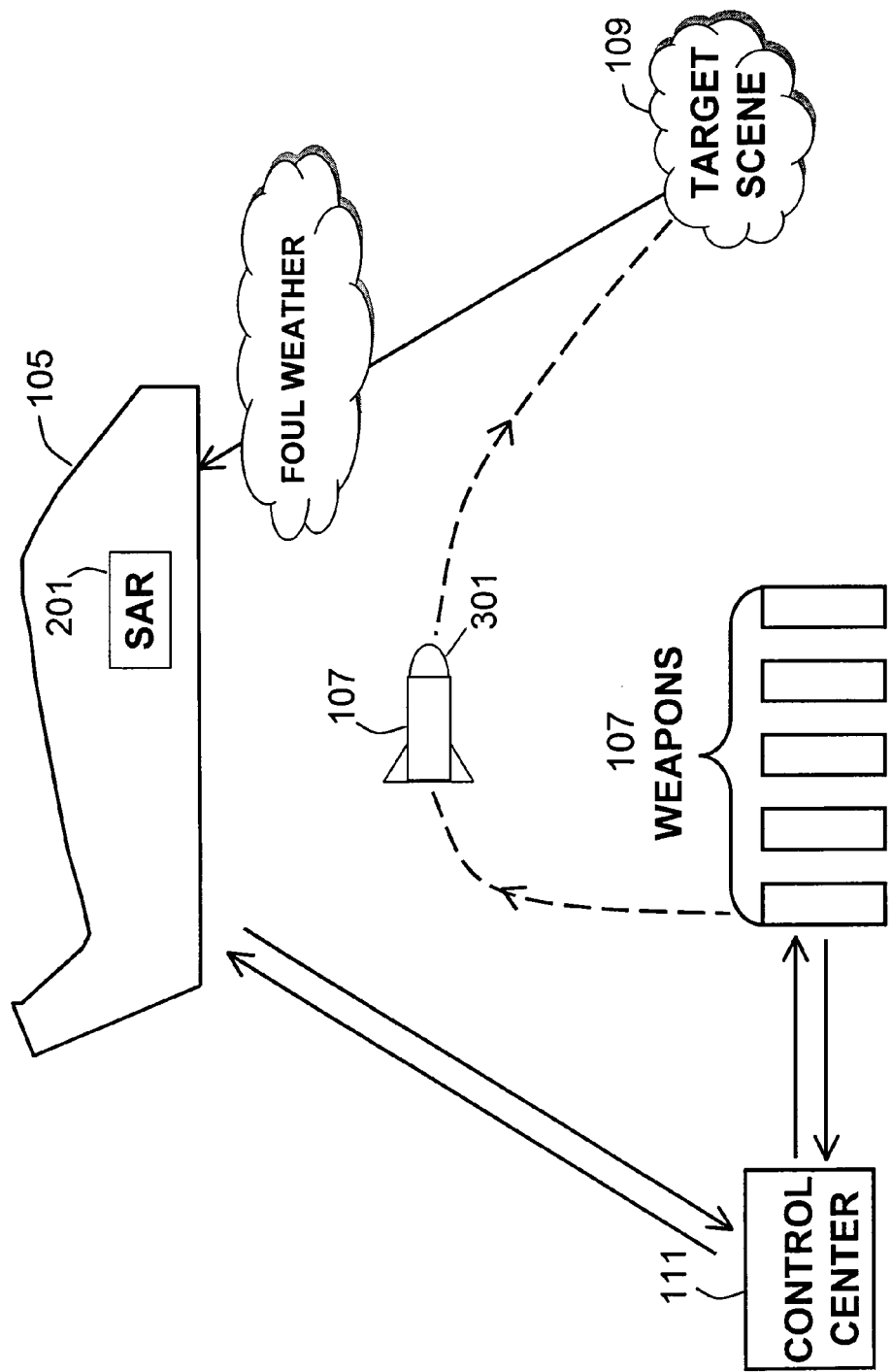
FIG. 3 shows the Reconfigurable ATR system wherein the primary target sensor on the surveillance platform is a SAR and the secondary target sensor on the weapon is a laser radar.
Figure 4:
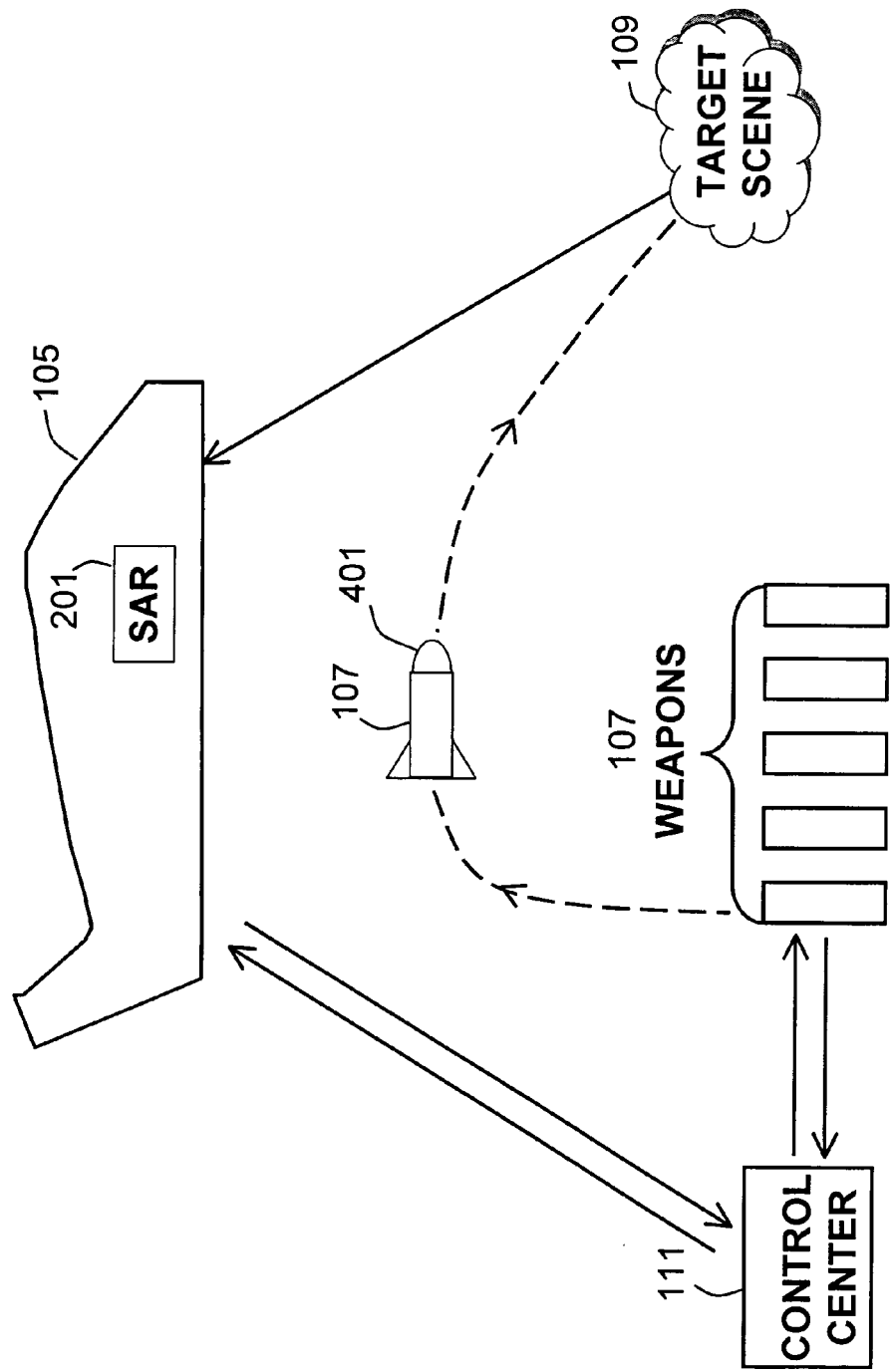
FIG. 4 shows the Reconfigurable ATR system wherein the primary target sensor is a SAR and the secondary target sensor is an electro-optical sensor.

The target spatial information derived by the control center can also be transmitted to weapons with laser radar 301 or electro-optical or hyperspectral sensor 401, as illustrated in FIGS. 3 and 4, respectively, if the weather encompassing the selected weapon trajectory is fair. A method for fusing SAR and hyperspectral image data sets over the same area is taught by Su May Hsu et al. in "SAR and HSI Data Fusion for Counter CC&D," *The Record of the IEEE* 1999 *Radar Conference*, pages 218–220. The article describes the Hsu method as it was practiced on a collection of images of suspected target vehicles obtained by the Foliage Penetration SAR and hyperspectral images (HSI) of camouflage nets and other background terrain characteristics obtained by the hyperspectral sensor. In the Hsu method, the SAR and HSI data are first processed separately for detection of target objects and terrain classification, respectively. SAR data is processed with pixel grouping and thresholding for target detection. The terrain classification and spectral feature extraction in HSI data is accomplished by reducing the dimensionality of the HSI data. The reduction of the dimensionality is performed by first obtaining Eigenvectors and then using the Eigenvectors to transform HSI data into principal components, also known as Eigenimages. Principal component transform allows the segregation of noise components and the determination of the inherent dimensionality of the HSI data. Using iso-data clustering, terrain features, such as trees, roads and camouflage nets can be distinguished and mapped. To combine the SAR and HSI data, co-registration is first performed with reference to terrain features using scaling, rotation and translation operations. Then, fusion process follows based on the co-registered images. SAR detections that coincide with HSI identifications as trees or camouflage nets, for example, are eliminated as false alarms, thus increasing the accuracy of the target detection by SAR.

Figure 5:
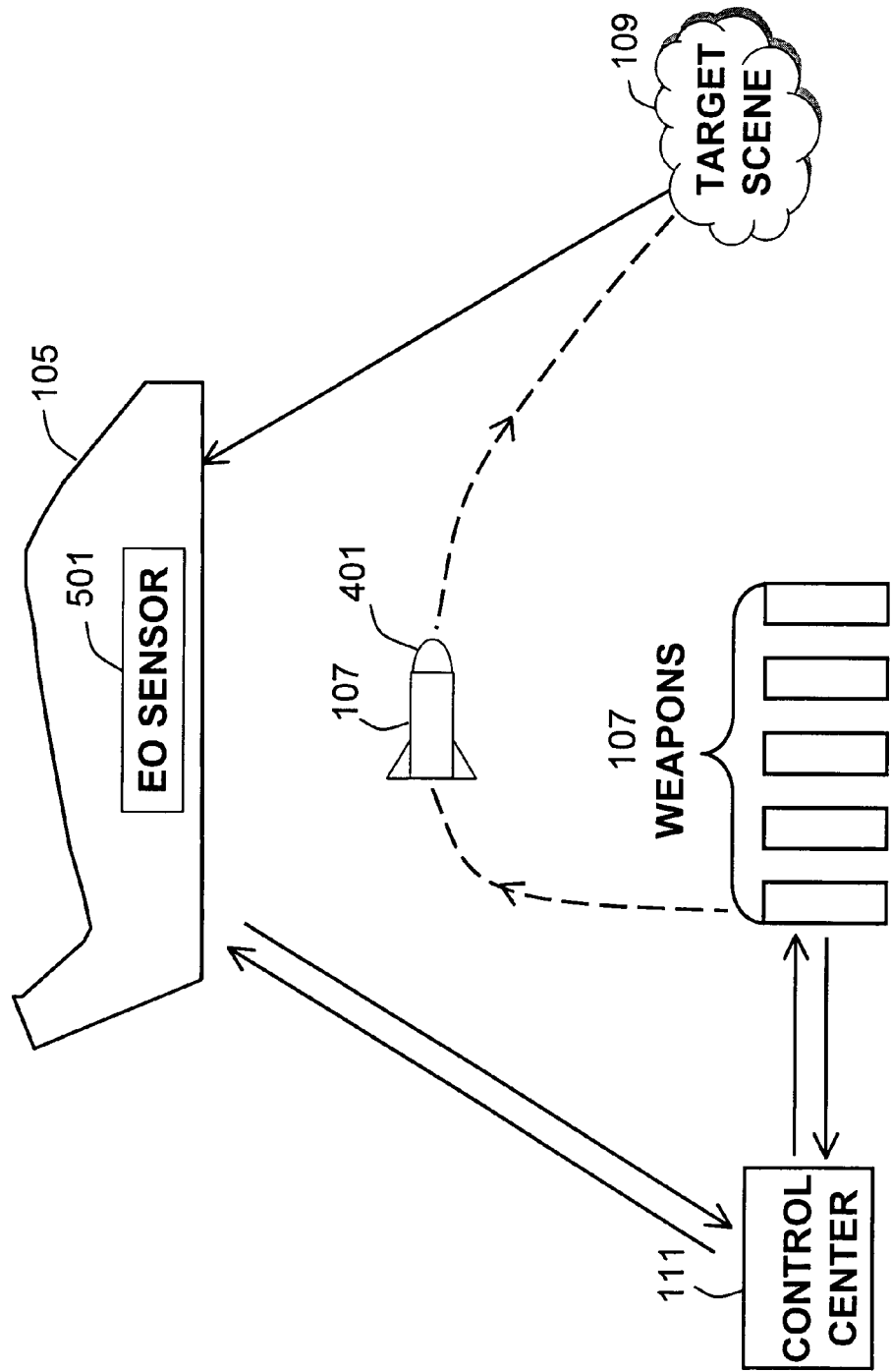
FIG. 5 shows the Reconfigurable ATR system wherein both the surveillance and weapon sensors are electro-optical sensors.

If the weather conditions allow, use of purely passive sensors such as electro-optical sensors 501 and 401 is highly desirable because it minimizes the potential of alerting the targets during multiple simultaneous weapon engagements. This is illustrated in FIG. 5. Substitution of the electro-optical sensors with hyperspectral sensors may afford the ability to detect specific materials used in a target object.

The embodiment, depicted in FIG. 1, utilizing multi-spectral sensors both on the surveillance platform and on the non-reusable weapons may entail substantial costs. An alternative is to use simultaneously the combinations of various types of primary (on the surveillance platform) and secondary (on the weapons) sensing means as described above with reference to FIGS. 2 through 5. Many surveillance platforms having thereon various types of primary sensing means may be deployed, all communicating with a common control center. Likewise, many groups of weapons can be positioned at various locations, each group in turn comprising multiple weapons having different secondary sensing means. In this way, great flexibility is built into the Weather-Agile Reconfigurable ATR system to achieve the least wasteful and most accurate precision strikes against selected targets.

Although a particular embodiment and form of this invention has been illustrated, it is apparent that various modifications and embodiments of the invention nay be made by those skilled in the art without departing from the scope and spirit of the foregoing disclosure. Accordingly, the scope of the invention should be limited only by the claims appended hereto.

We claim:

1. A Weather-Agile Automatic Target Recognition System for performing a rapid target update in diverse weather conditions, said system comprising: a primary multi-spectral target sensing means for sensing targets in diverse climatic conditions and generating target signature corresponding to said sensed target; a plurality of weapons; a plurality of secondary multi-spectral target sensing means, one of said secondary sensing means being mounted on one of said weapons and enabling said weapon to seek the sensed target in any weather condition, said primary and secondary sensing means cooperating with each other to destroy selected targets; and a control center having therein pre-existing target, weaponry and environmental databases, said center positioned to communicate with said primary and secondary multi-spectral target sensing means, said center receiving said target signature from said primary sensing means and processing said signature using said pre-existing databases prior to transmitting said processed signature to said secondary sensing means residing on a weapon selected as having the greatest potential to accomplish a successful destruction of the sensed target.

2. A Weather-Agile Automatic Target Recognition System for performing a rapid target update as set forth in claim 1, wherein said primary multi-spectral target sensing means is mounted on an airborne surveillance platform positioned to observe a target scene and said control center transmits to said primary sensing means said pre-existing databases to facilitate efficient surveillance by said primary sensing means.

3. A Weather-Agile Automatic Target Recognition System for performing a rapid target update, said system comprising: a primary target sensing means mounted on an airborne surveillance platform, said primary sensing means sensing a diversity of targets in a first given climatic condition and generating target signature corresponding to said sensed target; a plurality of weapons, said weapons each having an individual secondary target sensing means, said individual sensing means enabling said weapons to seek the sensed target in a second given climatic condition, said primary and individual secondary sensing means cooperating with each other to destroy selected targets; and a control center having therein preexisting target, weaponry and environmental databases, said center positioned to communicate with said primary and individual secondary sensing means, said center transmitting to said first sensing means said pre-existing databases to facilitate effective surveillance by said first sensing means, receiving from said primary sensing means said target signature and processing said signature using said pre-existing databases to produce processed target signature, said center subsequently transmitting said processed target signature to said individual sensing means residing on a weapon selected as having the greatest potential to accomplish a successful destruction of the sensed target.

4. A Weather-Agile Automatic Target Recognition System for performing a rapid target update as set forth in claim 3, wherein said primary sensing means comprises a synthetic aperture radar for maximum target recognition in cloudy, foggy or rainy weather, and each individual secondary sensing means comprises a synthetic aperture radar for maximum target recognition and destruction in cloudy, foggy or rainy weather in response to said processed target signature.

5. A Weather-Agile Automatic Target Recognition System for performing a rapid target update as set forth in claim 3, wherein said primary sensing means comprises a synthetic aperture radar for maximum target recognition in cloudy, foggy or rainy weather, and each individual sensing means comprises a laser radar for maximum target recognition and destruction in fair weather in response to said processed target signature.

6. A Weather-Agile Automatic Target Recognition System as set forth in claim 3, wherein said primary sensing means comprises a synthetic aperture radar for maximum target recognition in cloudy, foggy or rainy weather, and each individual sensing means comprises an electro-optical sensor for maximum target recognition and destruction in fair weather in response to said processed target signature.

7. A Weather-Agile Automatic Target Recognition System as set forth in claim 3, wherein said primary sensing means comprises an electro-optical sensor for target recognition in fair weather, and each individual sensing means comprises an electro-optical sensor for maximum target recognition and destruction in fair weather in response to said processed target signature.

8. A Reconfigurable Automatic Target Recognition System for performing a rapid target update in diverse weather conditions, said system comprising: a plurality of primary target sensing means; a plurality of airborne surveillance platforms, each of said primary target sensing means being mounted onto one of said platforms such that there are no more than one primary target sensing means on any one platform, each of said primary target sensing means sensing a plurality of targets in a given climatic condition and generating target signature corresponding to said sensed target; a plurality of weapons, said weapons each hosting an individual secondary target sensing means such that each weapon hosts no more than one individual secondary target sensing means, said individual sensing means enabling its hosting weapon to seek the sensed target in any climatic condition, said primary and individual secondary sensing means cooperating with each other to destroy selected targets; and a control center having therein pre-existing target, weaponry and environmental databases, said center positioned to communicate with said plural primary and individual secondary sensing means, said center receiving said target signature from one or more of said primary sensing means and processing said signature using said pre-existing databases prior to transmitting said processed target signature to said individual sensing means hosted in a weapon selected as having the greatest potential to accomplish a precision destruction of the sensed target.

9. A Reconfigurable Automatic Target Recognition System for performing a rapid target update in diverse weather conditions as set forth in claim 8, wherein some of said primary target sensing means are synthetic aperture radars and the others are electro-optical sensors.

10. A Reconfigurable Automatic Target Recognition System as set forth in claim 9, wherein some of said individual secondary target sensing means are synthetic aperture radars, some are laser radars and yet others are electro-optical sensors.

* * * * *